(12) United States Patent
Clark et al.

(10) Patent No.: US 7,815,068 B2
(45) Date of Patent: Oct. 19, 2010

(54) CONTAINER FOR WASTE MATERIAL

(75) Inventors: Gary Clark, Herts (GB); Gerald King, Essex (GB)

(73) Assignee: King's (LP) Limited (GB)

( * ) Notice: Subject to any disclaimer, the term of this patent is extended or adjusted under 35 U.S.C. 154(b) by 917 days.

(21) Appl. No.: 10/508,279

(22) PCT Filed: Mar. 19, 2003

(86) PCT No.: PCT/GB03/01201

§ 371 (c)(1),
(2), (4) Date: Aug. 1, 2005

(87) PCT Pub. No.: WO03/080477

PCT Pub. Date: Oct. 2, 2003

(65) Prior Publication Data

US 2006/0006177 A1    Jan. 12, 2006

(30) Foreign Application Priority Data

Mar. 19, 2002    (GB) .................................. 0206499.6

(51) Int. Cl.
*B65D 43/20* (2006.01)
*B65D 43/14* (2006.01)

(52) U.S. Cl. ...................... 220/345.1; 220/350; 220/908

(58) Field of Classification Search .............. 220/345.1, 220/252, 323, 245.2, 349, 350, 908
See application file for complete search history.

(56) References Cited

U.S. PATENT DOCUMENTS

| | | | | |
|---|---|---|---|---|
| 1,530,653 A * | 3/1925 | Cornell | ........................ | 160/201 |
| 4,138,154 A * | 2/1979 | McKeon | ........................ | 296/98 |
| 4,210,361 A * | 7/1980 | Marvin et al. | ................ | 296/210 |
| 4,717,196 A * | 1/1988 | Adams | ........................ | 296/98 |
| 4,786,099 A * | 11/1988 | Mount | ........................ | 296/98 |
| 4,795,206 A * | 1/1989 | Adams | ........................ | 296/98 |
| 4,889,381 A * | 12/1989 | Tamblyn et al. | ................ | 296/98 |
| 5,040,843 A * | 8/1991 | Russell et al. | .................. | 296/98 |
| 5,238,359 A * | 8/1993 | Chen | ........................ | 414/517 |
| 5,711,360 A * | 1/1998 | Viotte | ........................ | 160/310 |
| 5,975,329 A * | 11/1999 | Schmitt | ........................ | 220/350 |
| 6,230,782 B1 * | 5/2001 | Reichert | ........................ | 160/32 |
| 6,596,983 B2 * | 7/2003 | Brent | ........................ | 250/221 |

(Continued)

FOREIGN PATENT DOCUMENTS

DE    44 41 314    5/1996

(Continued)

*Primary Examiner*—Anthony Stashick
*Assistant Examiner*—Niki M Eloshway
(74) *Attorney, Agent, or Firm*—Woodcock Washburn LLP

(57) ABSTRACT

This invention relates to a container (1) for waste material comprising wall portions (4, 6, 7) defining an internal void space and at least one opening (21) through which waste material may be inserted and/or withdrawn from said void space, wherein a roller shutter (22) is provided which is movable from an extended position in which the opening is closed by the roller shutter to a retracted position in which the opening is substantially unobstructed, the roller shutter being wound onto a barrel arrangement (26) as it is retracted, wherein in the retracted position that portion of the roller shutter wound onto the barrel arrangement is located within the internal void space of the container defined by the wall portions.

23 Claims, 6 Drawing Sheets

U.S. PATENT DOCUMENTS

| | | | |
|---|---|---|---|
| 6,848,734 B1* | 2/2005 | Mulvaney | 296/98 |
| 6,883,852 B2* | 4/2005 | Laskey | 296/37.8 |
| 7,083,060 B2* | 8/2006 | Pickler | 220/1.5 |
| 2002/0017529 A1* | 2/2002 | Kruzick et al. | 220/813 |
| 2003/0146230 A1* | 8/2003 | Eaton et al. | 220/826 |
| 2006/0090860 A1* | 5/2006 | Corboy | 160/133 |

FOREIGN PATENT DOCUMENTS

| | | |
|---|---|---|
| GB | 1 297 230 | 11/1972 |

\* cited by examiner

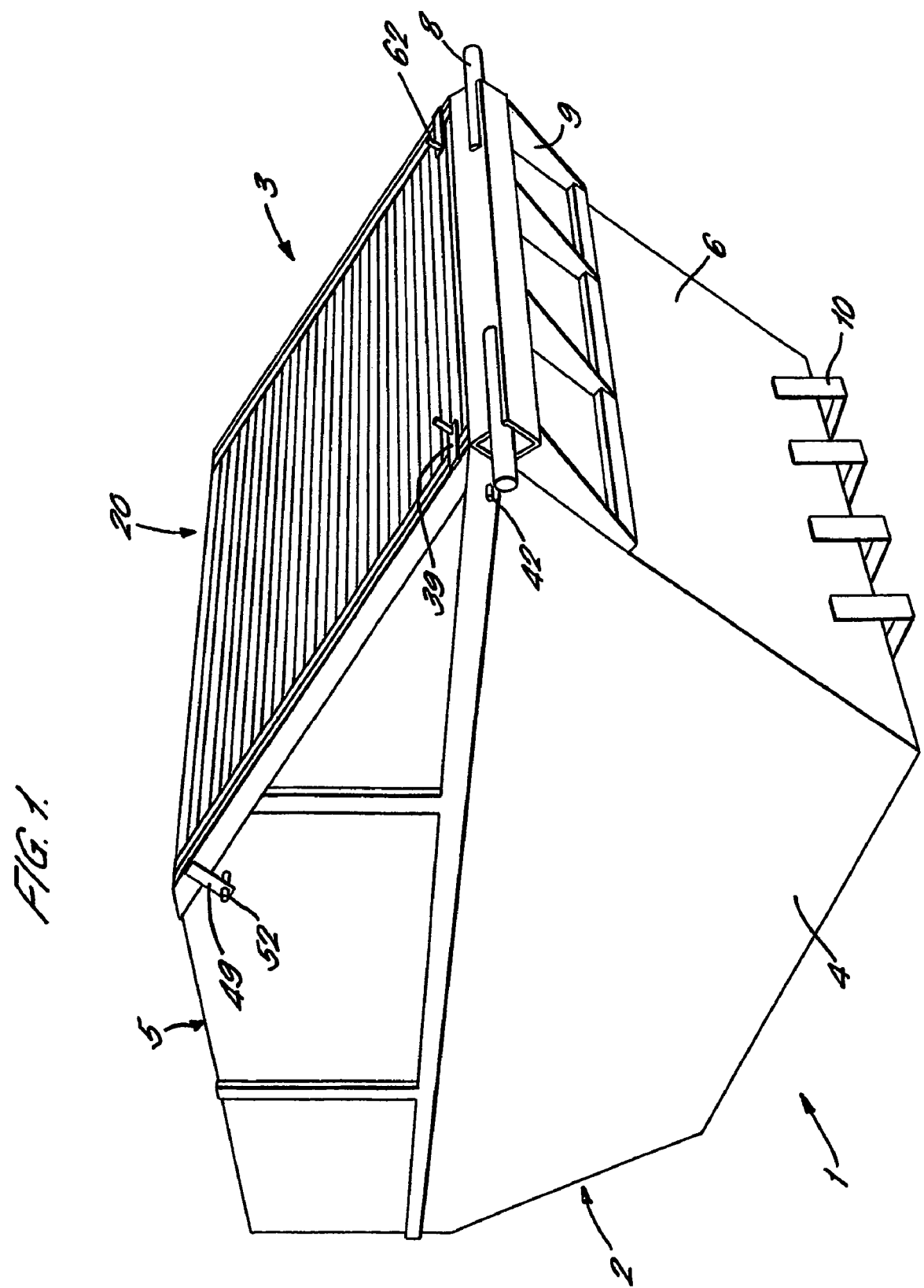

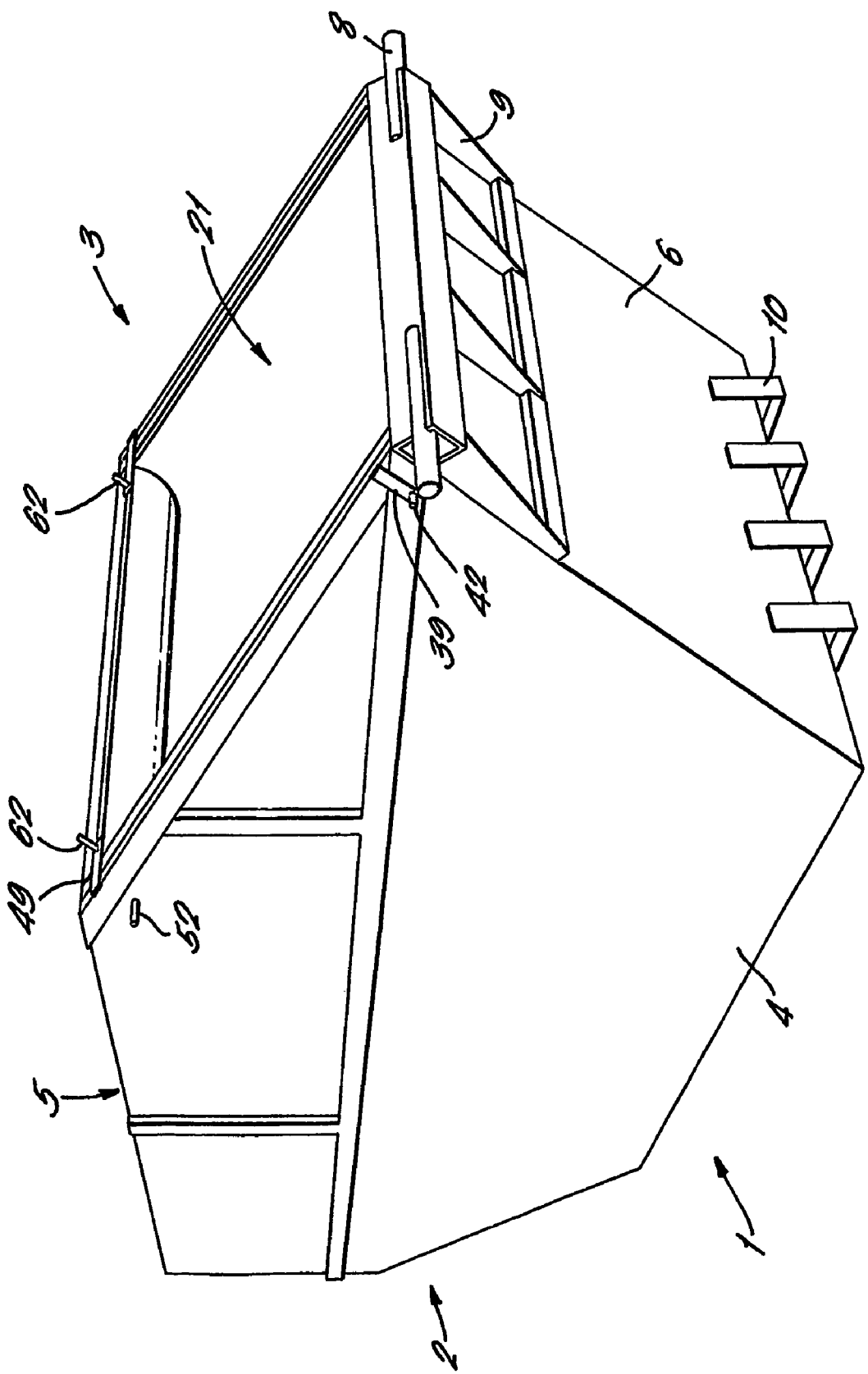

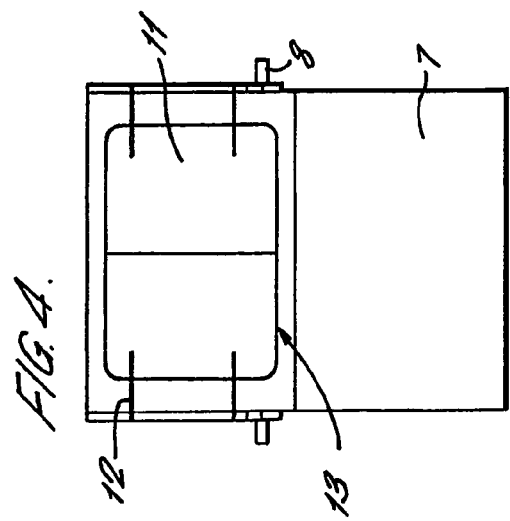
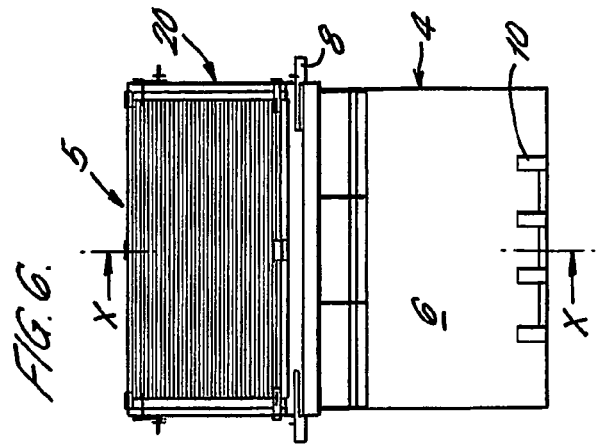
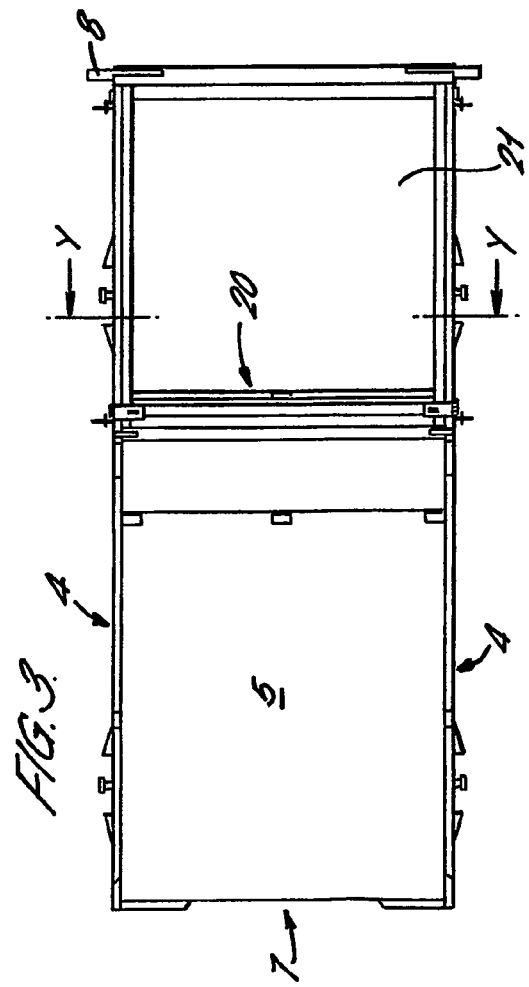
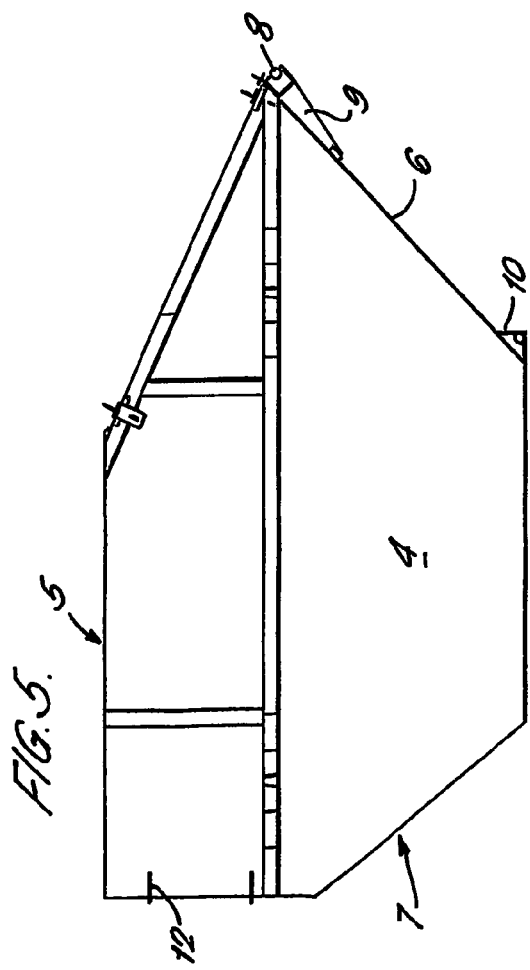

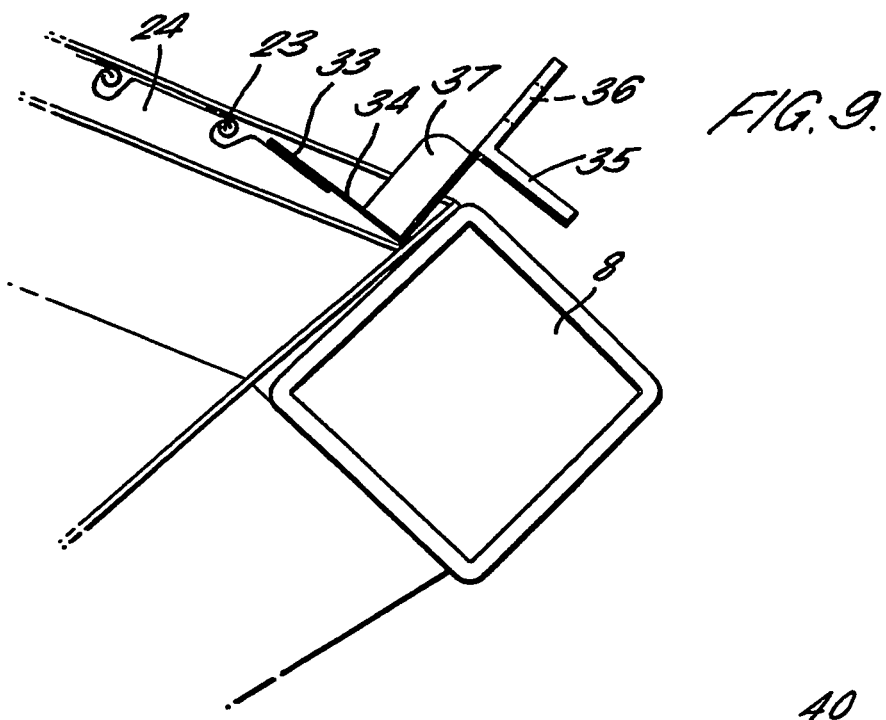
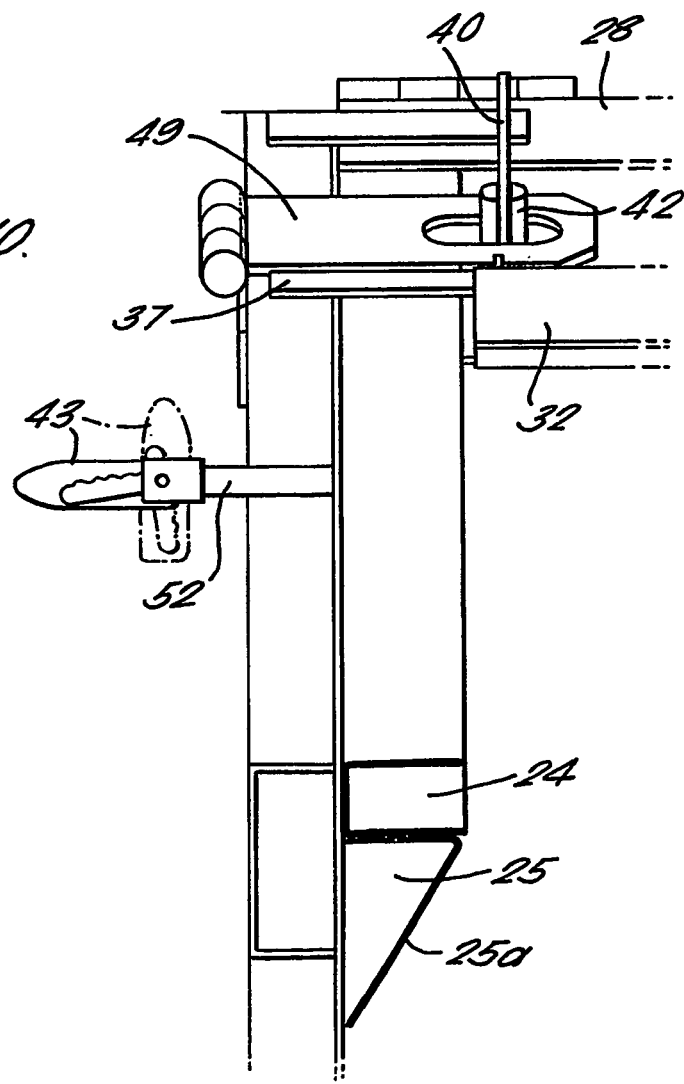

CONTAINER FOR WASTE MATERIAL

CROSS REFERENCE TO RELATED APPLICATIONS

This claims priority to International Patent Application Number PCT/GB2003/01201, filed Mar. 19, 2003, which claims priority to UK Patent Application Number 0206499.6, filed Mar. 19, 2002, the entireties of each of which are incorporated by reference herein.

The present invention relates to improvements to a container, in particular, a lid system for a container used for storing waste material.

Containers for storing waste material are well-known, a particularly common type of container being an open-topped receptacle known as a 'skip'. Skips are used to collect relatively large volumes of waste material which are then removed along with the skip by a waste processing company. Another type of waste container which forms a substantial part of the commercial waste disposal market is the 'rear end loader' container. Rear end loader containers commonly have two openings, one at each end. The loading end is used by the end user for inserting waste material into the container. The other end of the container forms the discharge end through which the waste material is removed from the container by means of a specialised mobile compaction vehicle. In typical usage, the rear end loader container remains on the end user's premises and the mobile compaction vehicle periodically visits the end user's premises to remove the stored waste material for further processing or land fill.

Since the rear end loader containers are commonly left for long periods of time at the end user's premises, they are subject to many adverse factors. These include vandalism, which may involve damage to the container or removal and littering of waste material from the container; arson attacks, in which the contents of the container are set alight; theft of material from the container perceived to have some secondary value; and unauthorised use of the container, wherein unauthorised users deposit their waste material in the container.

Currently, the loading end of the rear end loader container may be adequately secured by the provision of a pair of hinged steel plate doors which can be locked to one another. This is possible since the opening in the loading end is on a substantially vertical face of the rear end loader container and is relatively small. As such, the size and weight of the hinged doors required is such that the end user may open and close the doors without undue effort. Also, the height of typical rear end loader containers is such that access to the hinged doors is not overly difficult.

However, hinged doors are not suitable for closing the discharge end of the container which is typically provided on a sloping surface of the rear end loader container. Also, the size of the orifice at the discharge end of the rear end of the container is substantially greater than that of the loading end meaning that the weight of a hinged door would be such as to be unsafe for an end user to open or close. Some means is required of securing the opening at the discharge end of the container which is easy to operate by the end user.

Current efforts to address this problem have resulted in the use of plastic lids formed as a single piece. However, such lids are still vulnerable to vandalism and arson attack and, even though the lid is made of plastic, the physical effort required to open and close the lid is often beyond the capabilities of the end user.

DE 4441314 A1 discloses a device providing a covering for the upper opening of an open-topped skip. The device comprises a roller shutter which can be slid and/or rolled up. Guide rails are provided on which slats of the roller shutter are mounted by means of bearings. The roller shutter in the rolled up condition is stored on a rotatable drum housed in a housing which is bolted or otherwise fixed to the exterior of the skip at the front end. A disadvantage of the container of DE 4441314 A1 is that the external dimensions of the skip are increased since the covering apparatus must be mounted on the exterior of the skip. As a result, the skip can not easily be used with conventional lifting apparatus or vehicles. Further, the device is unsuitable for use with a rear end loader container which has openings at both ends since the shutter device would substantially impede access to one or other of the ends of a rear end loader container. Further, DE 4441314 A1 does not disclose an effective, vandal-proof means of securing the lid.

It is an object of the present invention to provide a securable lid for a container such as a rear end loader container which overcomes some or all of the problems and disadvantages outlined above.

Accordingly, the present invention provides a container for waste material comprising wall portions defining an internal void space and at least one opening through which waste material may be inserted and/or withdrawn from said void space, wherein a roller shutter is provided which is movable from an extended position in which the opening is closed by the roller shutter to a retracted position in which the opening is substantially unobstructed, the roller shutter being wound onto a barrel arrangement as it is retracted, wherein in the retracted position that portion of the roller shutter wound onto the barrel arrangement is located within the internal void space of the container defined by the wall portions.

An embodiment of the present invention will now be described, by way of example only, with reference to the following drawings in which:

FIG. 1 is a perspective view of a container according to the present invention having a lid in a closed position;

FIG. 2 is a perspective view of the container of FIG. 2 with the lid in an open position;

FIG. 3 is a plan view of the container of FIG. 2;

FIG. 4 is a rear elevation of the container of FIG. 1 from a first, loading, end;

FIG. 5 is a side elevation of the container of FIG. 1;

FIG. 6 is an end elevation of the container of FIG. 1 from a second, discharge, end;

FIG. 9 is an enlarged cross-sectional view of a part of the lid of FIG. 7 taken on line X-X of FIG. 6, with the lid in the closed position; and FIG. 10 is a cross-sectional view of a part of the container of FIG. 1 taken on line Y-Y of FIG. 3.

Figure 7:
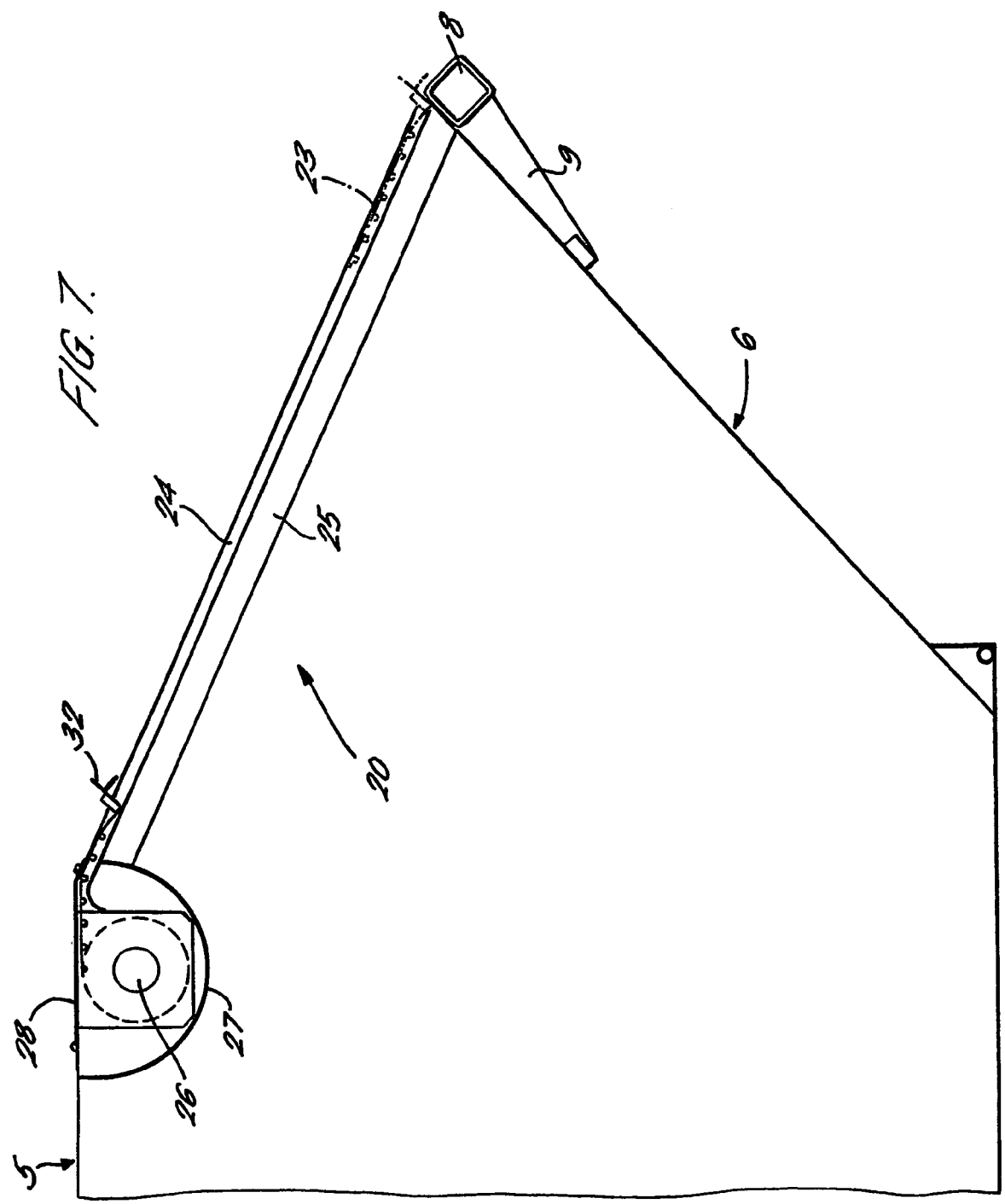
FIG. 7 is a cross-sectional view of part of the container of FIG. 1 taken on line X-X of FIG. 6, schematically showing the lid in open and closed positions.

As shown in FIGS. 1 to 6, the present invention relates to a lid system 20 for use on a container 1 which, by way of example during this description and in the Figures, is described and illustrated as of the rear end loader type. The rear end loader container 1 comprises a hollow steel body having side walls 4, a front wall 6, a rear wall 7 and a roof 5 defining a void space therein. A front opening 21 is provided at a discharge end 3 of the container 1 and a rear opening 13 is provided at an opposite, loading, end 2 of the container 1. In the example of the container 1 shown in the Figures, the rear opening 13 is provided in a substantially vertical portion of the rear wall 7 whilst the front opening 21 is provided in a sloping section of the front wall 6 of the container 1. The front opening 21 is substantially larger than the rear opening 13.

In use, an end user of the container 1 inserts waste material through the rear opening 13 into the internal void space of the container 1. The container 1 is then periodically emptied by means of a mobile compaction vehicle through the front opening 21.

The discharge end 3 of the container 1 is provided with a pick-up bar 8 by which the mobile compaction vehicle may lift and tilt the container 1 in order to empty it. The pick-up bar 8 comprises a length of hollow metal tubing of square section and two cylindrical metal bars extending from either end of the hollow tubing. Strengthening webs 9 are provided connected to the pick-up bar 8 in order to strengthen the connection of the pick-up bar 8 to the front wall 6.

Feet 10 are provided on the container at a lower edge of the front wall 6 to stabilise the container 1 when placed on the ground and when initially tipped.

It is known to provide doors 11 to close the rear opening 13 as shown in FIG. 4. The doors 11 are mounted to the rear wall 7 by means of hinges 12 and rotate thereabout in order to open and close the rear opening 13. Optionally, the rear doors 11 may be locked to one another to prevent opening of the rear opening 13 by means such as a padlock.

According to the present invention, a lid system 20 is provided to close and secure the front opening 21. The lid system 20 comprises a roller shutter 22 formed from a plurality of slats 23 which are joined to one another so as to allow a degree of flexibility between each slat. Shutter guides 24 in the form of channel members are located on each side of the front opening 21 and are rigidly mounted to the side walls 4. The shutter guides 24 are mounted such that the opening of the channel of each guide is directed inwardly towards one another. The roller shutter 22 is received between the shutter guides 24 and is slidable therealong. The spacing of the two shutter guides 24 is such that, whilst the roller shutter 22 can slide along the shutter guides 24, the roller shutter 22 cannot be lifted out of the plane of the shutter guides 24.

Immediately below each shutter guide 24 is provided a formed steel section 25 as shown in FIG. 10 which acts to bear some of the transverse load imparted on the shutter guides 24 in use. In addition, the angled face 25a of the steel sections 25 acts to deflect material passing through the front opening 21 such that the material passes the shutter guides 24 and is not caught or obstructed thereupon.

Figure 8:
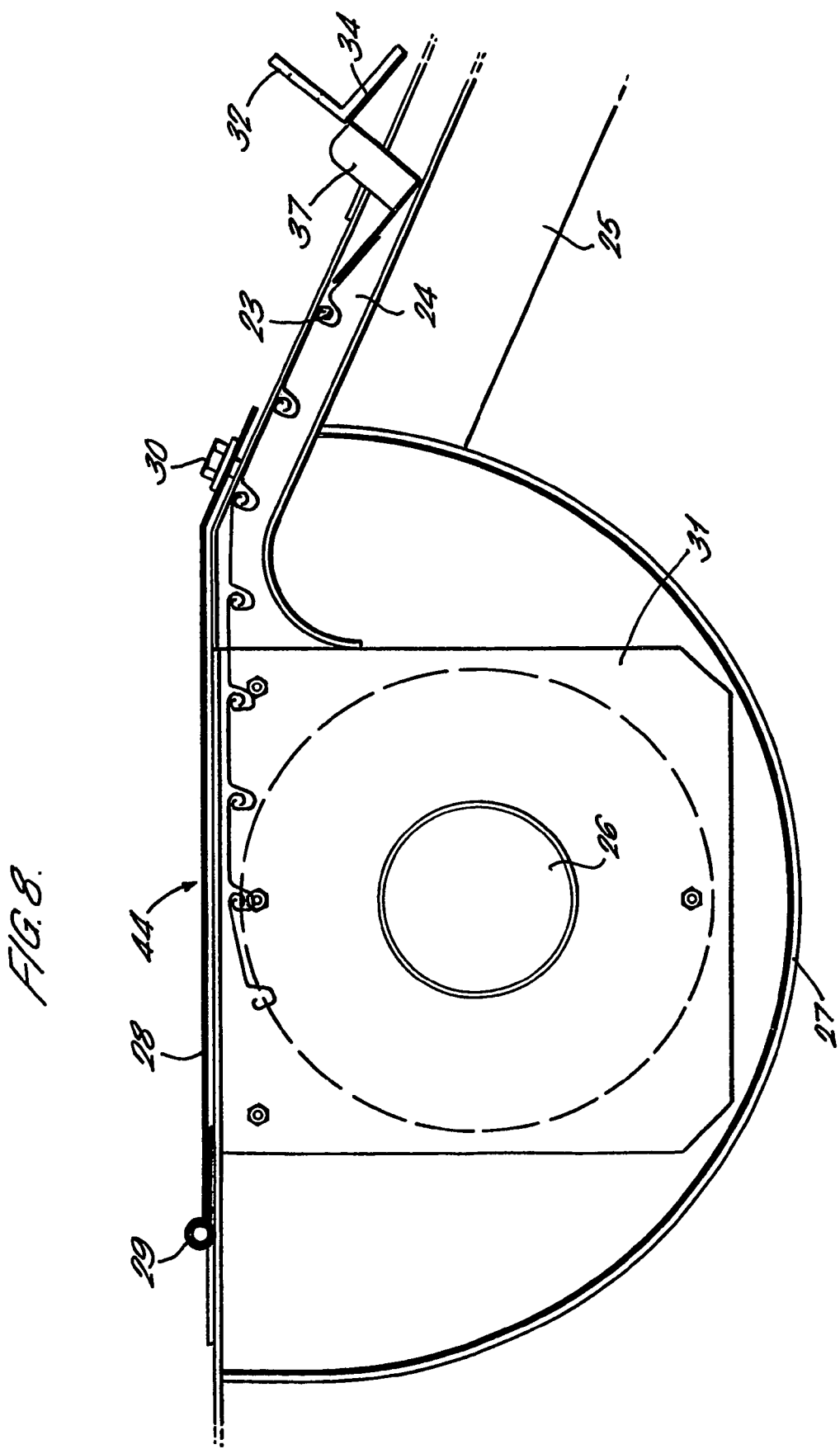
FIG. 8 is an enlarged view of a part of the roller mechanism of the lid of FIG. 7.

As shown in FIGS. 7 and 8, the roller shutter 22 is movable along the shutter guides 24 from a closed position in which the roller shutter 22 completely covers the front opening 21 to an open position in which the roller shutter 22 is retracted such that the front opening 21 is substantially open. As shown in FIG. 7, in the retracted position, the roller shutter 22 is wound onto a roller barrel 26 which is located within the container 1. The roller barrel 26 is rotatably mounted to a pair of mounting plates 31 which are fixed either to the side walls 4 or to the roof 5 of the container 1 by welds or bolts. An arcuate belly plate 27 is provided around the roller barrel 26 forming an encasement panel between the roller barrel 26 and the internal void space of the container 1. In use, the arcuate belly plate 27 prevents waste material contacting and potentially damaging or obstructing the operation of the roller barrel 26. This is especially important during emptying of the container 1 at which point the container 1 is tipped up and the waste material would otherwise be brought into contact with the roller barrel 26.

As shown most clearly in FIG. 8, the roof 5 of the container 1 is provided with an aperture 44 through which the roller barrel 26 may be accessed in order to carry out maintenance and inspections. In normal use, the aperture 44 is covered by an access flap 28 which is rotatable about a hinge 29 mounted on roof 5. The access flap 28 is retained in the closed position by means of a threaded bolt 30.

As seen most clearly in FIG. 9, the free end of the roller shutter 22 is provided with a leading edge arrangement 32. The leading edge arrangement 32 comprises an S-shaped metal section 34 which is bolted or welded to the free end of the roller shutter 22. The S-shaped section 34 comprises a shutter stop 37. A distal end of the S-shaped section is provided with an eyelet 36. As shown in FIG. 9, when the roller shutter 22 is in the closed position, the leading edge arrangement 32 is bought into close proximity with the pick-up bar 8 of the container 1. In this position, the S-shaped 34 extends upwardly and forwardly of the rear edge of the hollow square-section tubing of the pick-up bar 8. In this way, vandalism is deterred since it is far more difficult to insert a lever between the free end of the roller shutter 22 and the pick-up bar 8 to attempt to lever open the roller shutter 22. The eyelet 36 provides an attachment point by which an end user may use a pole or similar to hook the eyelet 36 and pull down the roller shutter 22 from the open position to the closed position, thereby making easier the operation of the roller shutter. Preferably, a pole is supplied with the lid system 20 which interfaces with the eyelet 36.

In order to secure the roller shutter 22 in either the open or the closed positions, a locking mechanism 38 is provided. The locking mechanism 38 comprises two pairs of hasps 39, 49 which are mounted to the side walls 4 of the container 1. A first pair of hasps 39 is mounted at or near the lower edge of the front opening 21 near the pick-up bar 8. The second pair of hasps 49 is mounted at or near the top edge of the front opening 21 near the access flap 28. Aligned with the pairs of hasps 39, 49 are two pairs of pins 42, 52 which project outwardly from the side walls 4 of the container 1. In addition, a pair of pins 62 are provided projecting upwardly from the roller shutter 22. Each of the pins 42, 52, 62 is provided with a hinged striker 43 which can be pivoted about the pin 42, 52, 62 from a position in which the striker 43 is substantially axially aligned with the pin to a position in which the striker 43 lies substantially transverse to the pin axis. FIG. 10 shows the striker 43 in both of these orientations. The pin and striker arrangement is also known as a droplock pin. In use, when the roller shutter 22 is in the closed position, the hasps 39 can be rotated about their hinges so as to engage the pins 62 projecting from the roller shutter 22. The hinged striker 43 on each pin 62 can then be rotated into the transverse position in order to prevent the hasps 39 being disengaged. If required, a padlock or other locking means can be attached to the striker 43 to prevent disengagement of the hasp 39 by an unauthorised person.

In order to open the roller shutter 22, the hasps 39 are first disengaged from the pins 62 projecting from the roller shutter 22. The hasps 39 are then rotated clear of the roller shutter 22 and the roller shutter 22 is retracted onto the roller barrel 26. The roller shutter 22 can then be secured in the open position by rotating the top pair of hasps 49 into engagement with the pins 62 projecting from the roller shutter 22. As before, the hasps 49 may be secured by rotating the hinged strikers 43 into the transverse position and securing with a padlock. In this way, the roller shutter 22 can be securely locked in either the open or the closed position. When the hasps 39, 49 are not being used, for example, the lower pair of hasps 39 when the roller shutter 22 is in the open position, the hasps 39, 49 may be securely engaged with the pins 42, 52 projecting from the side walls 4 of the container 1.

An advantage of the lid system 20 of the present invention is that the roller mechanism is located within the void space of the container 1. As such, the external dimensions of the container 1 are not changed and consequently the containers can readily be used with conventional lifting apparatus. In addition, neither of the openings 21, 13 are obscured.

A further advantage is that the lid system 20 can be retrofitted to existing containers 1.

Whilst the present invention has been specifically described for use with a rear end loader container, it can equally be applied to other containers having one or more openings through which material is inserted and/or withdrawn.

The invention claimed is:

1. A container for waste material comprising wall portions defining an internal void space and at least one opening through which waste material may be inserted and/or withdrawn from said void space, wherein a roller shutter is provided which is movable from an extended position in which the opening is closed by the roller shutter to a retracted position in which the opening is substantially unobstructed, the roller shutter being wound onto a barrel arrangement as it is retracted, wherein the barrel arrangement is located proximate to an uppermost edge of the opening, and in the retracted position the portion of the roller shutter wound onto the barrel arrangement is located within the internal void space of the container defined by the wall portions, laterally offset from the opening and adjacent an internal surface of at least one of the wall portions, such that it is accessible through the opening.

2. A container as claimed in claim 1, wherein an encasement panel is provided to separate the barrel arrangement from the remainder of the internal void space.

3. A container as claimed in claim 2, wherein the encasement panel is arcuately shaped.

4. A container is claimed in claim 1, wherein an aperture is provided in the wall portions through which the barrel arrangement may be accessed.

5. A container as claimed in claim 4, wherein the aperture is closeable by an access flap.

6. A container as claimed in claim 5, wherein the access flap may be secured in the closed position by means of a mechanical fastening means.

7. A container as contained in claim 1, wherein a leading edge of the roller shutter is provided with anti-vandal means.

8. A container as claimed in claim 7, wherein the anti-vandal means comprises a guard plate which prevents access to the leading edge of the roller shutter.

9. A container as claimed in claim 8, wherein the guard plate is formed as an S-shaped metal section.

10. A container as claimed in claim 1, wherein shutter guides are provided on either side of the opening to guide movement of the roller shutter.

11. A container as claimed in claim 10, wherein the shutter guides are in the form of substantially U-shaped channels.

12. A container as claimed in claim 10, wherein means are provided to deflect material passing through the opening past the shutter guides.

13. A container as claimed in claim 12, wherein the deflecting means comprises an element mounted beneath each shutter guide, wherein the element has an angled face serving to deflect material striking the face.

14. A container as claimed in claim 1, wherein the container is a waste receptacle.

15. A container as claimed in claim 1, wherein the container comprises two openings forming a loading aperture and a discharge aperture.

16. A container as claimed in claim 1, wherein locking means are provided to secure the roller shutter.

17. A container as claimed in claim 16, wherein locking means are provided to secure the roller shutter in the closed position.

18. A container as claimed in claim 16, wherein locking means are provided to secure the roller shutter in the open position.

19. A container as claimed in claim 16, wherein the locking means comprises inter-engaging mechanical fastening means, wherein a first part of the inter-engaging means is mounted to the wall portions of the container and the second portion of the inter-engaging means is secured to the roller shutter.

20. A container as claimed in claim 19, wherein the inter-engaging means comprises one or more hasps and droplock pins.

21. A container as claimed in claim 1, wherein the wall portions include a roof portion.

22. A kit of parts for a lid system for a container comprising wall portions defining an internal void space and at least one opening through which waste material may be inserted and/or withdrawn from said void space, comprising a roller shutter movable from an extended condition to a retracted condition, a barrel arrangement onto which the roller shutter is wound as it is retracted, an encasement panel for enclosing the barrel arrangement when fitted to a container and at least one set of inter-engaging mechanical fastening means for securing the roller shutter relative to a container, wherein in the retracted condition the portion of the roller shutter wound onto the barrel arrangement is located within the internal void space of the container defined by the wall portions, laterally offset from the opening and adjacent an internal surface of at least one of the wall portions, such that it is accessible through the opening and wherein the barrel arrangement is for location proximate to an uppermost edge of the opening.

23. A container as claimed in claim 22, wherein the wall portions include a roof portion.

* * * * *